United States Patent
Kouncar (10) Patent No.: US 9,788,054 B2
(45) Date of Patent: Oct. 10, 2017

(54) SYSTEMS AND METHODS FOR MANAGING VIDEO TRANSMISSION AND STORAGE

(75) Inventor: Waleed Kouncar, Blainville (CA)

(73) Assignee: VERINT AMERICAS INC., Alpharetta, GA (US)

( * ) Notice: Subject to any disclaimer, the term of this patent is extended or adjusted under 35 U.S.C. 154(b) by 543 days.

(21) Appl. No.: 13/464,662

(22) Filed: May 4, 2012

(65) Prior Publication Data

US 2012/0281115 A1    Nov. 8, 2012

Related U.S. Application Data

(60) Provisional application No. 61/482,254, filed on May 4, 2011, provisional application No. 61/489,555, filed on May 24, 2011.

(51) Int. Cl.
H04N 21/4335 (2011.01)
H04N 21/4402 (2011.01)
H04N 5/77 (2006.01)
H04N 9/804 (2006.01)

(52) U.S. Cl.
CPC ....... H04N 21/440254 (2013.01); H04N 5/77 (2013.01); H04N 9/8042 (2013.01); H04N 21/4335 (2013.01)

(58) Field of Classification Search
CPC ....... H04N 21/4335; H04N 21/440254; H04N 5/77; H04N 9/8042
See application file for complete search history.

(56) References Cited

U.S. PATENT DOCUMENTS

| 5,557,298 | A  | * | 9/1996 | Yang ................... G06F 3/14 345/555 |
| 2006/0029227 | A1 | * | 2/2006 | Van Der Vleuten et al. ............... 380/200 |
| 2008/0294789 | A1 | * | 11/2008 | Nassor et al. .............. 709/231 |
| 2010/0195741 | A1 | * | 8/2010 | Chou et al. ............. 375/240.26 |
| 2010/0250763 | A1 | * | 9/2010 | Bouazizi .................. 709/231 |
| 2011/0145560 | A1 | * | 6/2011 | Moon et al. .................. 713/150 |
| 2011/0182353 | A1 | * | 7/2011 | Bae .................. H04L 65/607 375/240.02 |
| 2011/0208829 | A1 | * | 8/2011 | Kwon et al. ................. 709/217 |
| 2011/0299448 | A1 | * | 12/2011 | Meier et al. .................. 370/312 |

OTHER PUBLICATIONS

Rejaie et al. ("Layered quality adaptation for Internet video streaming," Selected Areas in Communications, IEEE Journal on, vol. 18, No. 12, pp. 2530-2543, Dec. 2000).*

* cited by examiner

Primary Examiner — Christopher S Kelley
Assistant Examiner — Maria Vazquez Colon
(74) Attorney, Agent, or Firm — Meunier Carlin & Curfman (57) ABSTRACT

Embodiments described herein provide systems and methods for managing quality level of video transmission and storage. In a particular embodiment, a method provides receiving a video at a received quality level in a video storage system and determining a characteristic of the video. The method further provides determining whether the characteristic satisfies a criteria and, if the characteristic satisfies the criteria, storing the video at a quality level associated with the criteria.

5 Claims, 9 Drawing Sheets

| | CONTENTS OF VIDEO STORAGE SYSTEM | | | |
|---|---|---|---|---|
| | Video 1 | Video 2 | Video 3 | Video 4 |
| Time 1 | Base, 1st, and 2nd Enhancement Layers Stored ★★★ | | | |
| Time 2 | ★★★ | Base and 1st Enhancement Layers Stored ★★ | | |
| Time 3 | 2nd Enhancement Layer Removed ★★ | ★★ | Base, 1st, and 2nd Enhancement Layers Stored ★★★ | |
| Time 4 | 1st Enhancement Layer Removed ★ | 1st Enhancement Layer Removed ★ | ★★★ | |
| Time 5 | Base Layer Removed | ★ | ★★★ | Base Layer Stored ★ |
| Time 6 | | | ★★★ | ★ |

★★★ = high quality
★★ = medium quality
★ = low quality

FIGURE 8

SYSTEMS AND METHODS FOR MANAGING VIDEO TRANSMISSION AND STORAGE

RELATED APPLICATIONS

This application claims the benefit of U.S. Provisional Application No. 61/482,254, filed May 4, 2011, and U.S. Provisional Application No. 61/489,555, filed May 24, 2011, which are hereby incorporated by reference in their entirety.

TECHNICAL BACKGROUND

Many common video systems capture video and store it for extended periods of time. Some of these video systems are used for surveillance and security applications. In some cases, video is captured over long periods of time because the objective is to capture video of unexpected or infrequently occurring events. Consequently, video systems used for these types of applications typically require large quantities of video storage space. New video is often being acquired and stored on an ongoing basis. Consequently, the amount of available video storage space can become a limiting factor.

A need to view security or surveillance video may not arise for a significant period of time after the video has been captured. Although most of the video may never be viewed or utilized, large quantities of video must be saved in order to have available the small number of video segments which might potentially be of interest at some point in the future. Because it is difficult to know when an investigation of a past incident or other need for video may arise, it is challenging to determine how long security or surveillance video should be retained before it is deleted.

Additionally, in security, surveillance, and monitoring applications (among others), video is often captured on an ongoing basis and it is often desirable to view or monitor the video on a live or real time basis. In some cases, video must be transmitted to another location for monitoring. The communication links used to transmit video may be subject to interference, competing uses, prioritized use, or other conditions which result in bandwidth limitations. As a result, limitations on real-time transmission of the video may exist.

OVERVIEW

Embodiments described herein provide systems and methods for managing quality level of video transmission and storage. In a particular embodiment, a method provides receiving a video at a received quality level in a video storage system and determining a characteristic of the video. The method further provides determining whether the characteristic satisfies a criteria and, if the characteristic satisfies the criteria, storing the video at a quality level associated with the criteria.

In some embodiments, the method provides, if the quality level associated with the criteria is lower than the received quality level of the video, reducing the quality level of the video by removing at least one of a plurality of layers of the video.

In some embodiments, the method provides that the plurality of layers of the video comprises scalable video coding (SVC) layers.

In some embodiments, the method provides determining an amount of time that the video has been stored in the video storage system. The method further provides determining whether the amount of time exceeds a threshold and, if the amount of time exceeds the threshold, removing at least one of the plurality of layers from the video.

In some embodiments, the method provides determining an available transmission bandwidth for transmitting the video to the video storage system. The method further provides determining a transmit quality level of the video based on the available transmission bandwidth, and transmitting the video at the transmit quality level to the video storage system.

In some embodiments, the method provides, if the transmit quality level indicates that the video should be reduced in quality level, removing at least one of the plurality of layers of the video.

In some embodiments, the method provides determining an available transmission bandwidth at a later time and, if the available transmission bandwidth at the later time is above a threshold value, transmitting the at least one of the plurality of layers of the video that was removed to the video storage system.

In some embodiments, the method provides receiving, in the video storage system, the at least the at least one of the plurality of layers of the video that was removed and storing the at least one of the plurality of layers of the video that was removed if the at least one of the plurality of layers of the video that was removed is consistent with the quality level associated with the criteria.

In some embodiments, the method provides that the transmit quality level equals the received quality level.

In another embodiment, a method of operating a video system provides determining an available transmission bandwidth for transmitting a video to a video storage system. The method further provides determining a transmit quality level of the video based on the available transmission bandwidth and transmitting the video at the transmit quality level to the video storage system.

In some embodiments, the method provides, if the transmit quality level indicates that the video should be reduced in quality level, removing at least one of the plurality of layers of the video.

In some embodiments, the method provides that the plurality of layers of the video comprises scalable video coding (SVC) layers.

In some embodiments, the method provides determining an available transmission bandwidth at a later time and, if the available transmission bandwidth at the later time is above a threshold value, transmitting the at least one of the plurality of layers of the video that was removed to the video storage system.

In some embodiments, the method provides receiving the video at a received quality level in the video storage system and determining a characteristic of the video. The method further provides determining whether the characteristic satisfies a criteria and, if the characteristic satisfies the criteria, storing the video at a quality level associated with the criteria.

In some embodiments, the method provides, if the quality level associated with the criteria is lower than the received quality level of the video, reducing the quality level of the video by removing at least one of a plurality of layers of the video.

In some embodiments, the method provides determining an amount of time that the video has been stored in the video storage system. The method further provides determining whether the amount of time exceeds a threshold and, if the amount of time exceeds the threshold, removing at least one of the plurality of layers from the video.

In some embodiments, the method provides receiving, in the video storage system, at least one of a plurality of layers of the video that was removed prior to transmitting the video at the transmit quality level to the video storage system. The method further provides storing the at least one of the plurality of layers of the video that was removed if the at least one of the plurality of layers of the video that was removed is consistent with the quality level associated with the criteria.

In some embodiments, the method provides that the transmit quality level equals the received quality level.

DETAILED DESCRIPTION

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

In video security, surveillance, and monitoring applications, the events or incidents which may be of interest are typically not known ahead of time. Consequently, video is captured and stored over extended periods of time, if not continuously, in order to improve the chances of capturing video of unexpected, unplanned, or presently unknown incidents or occurrences.

Although much of the video may not end up being used, some portions of the video may be viewed at a later time to investigate an accident, the location of an object, a person's behavior, a suspected activity, a transaction, or some other event which occurred, or may have occurred, within the scene. Because it is unknown when a need for a particular video or segment of video may arise, it is desirable to store the video as long as is reasonably possible. The desire to have the video available as long as possible is counterbalanced by the limited availability of storage space.

Since the specific use of the video is typically unknown at the time the video is captured, it is desirable to store the video in the highest quality form available. Retaining the highest quality video preserves as much information as possible and increases the chances that the video contains the desired details when the specific need arises. For example, a need may arise to determine the license plate number of a truck that was in a loading area at some particular day and time in the past. If the highest possible resolution of the video has not been stored, the truck may be visible but it may not be possible to read the license plate number.

Because the need for the video may arise much later in time, it would be desirable, absent other constraints, to keep all captured video indefinitely. However, the storage system will become full after some initial period of time. Consequently, stored video must be deleted in order to make storage space available for new video. If a need has not arisen for a particular video or segment of video, the chance of a need arising in the future typically decreases over time. For this reason, one common approach is to delete the oldest video in order to make room for the new video.

However, it is desirable to make additional storage available without completely deleting the information contained in the oldest video. This may be accomplished by reducing the quality of the oldest video rather than deleting it. The reduced quality video requires less storage space that the original video of full or high quality. If a need for the old video arises after this point in time, the reduced quality video may still contain enough information to meet the need. Continuing with the earlier example, a user may still be able to determine the make, model, and color of the truck from the reduced quality video even though the license plate number cannot be determined.

Figure 1:
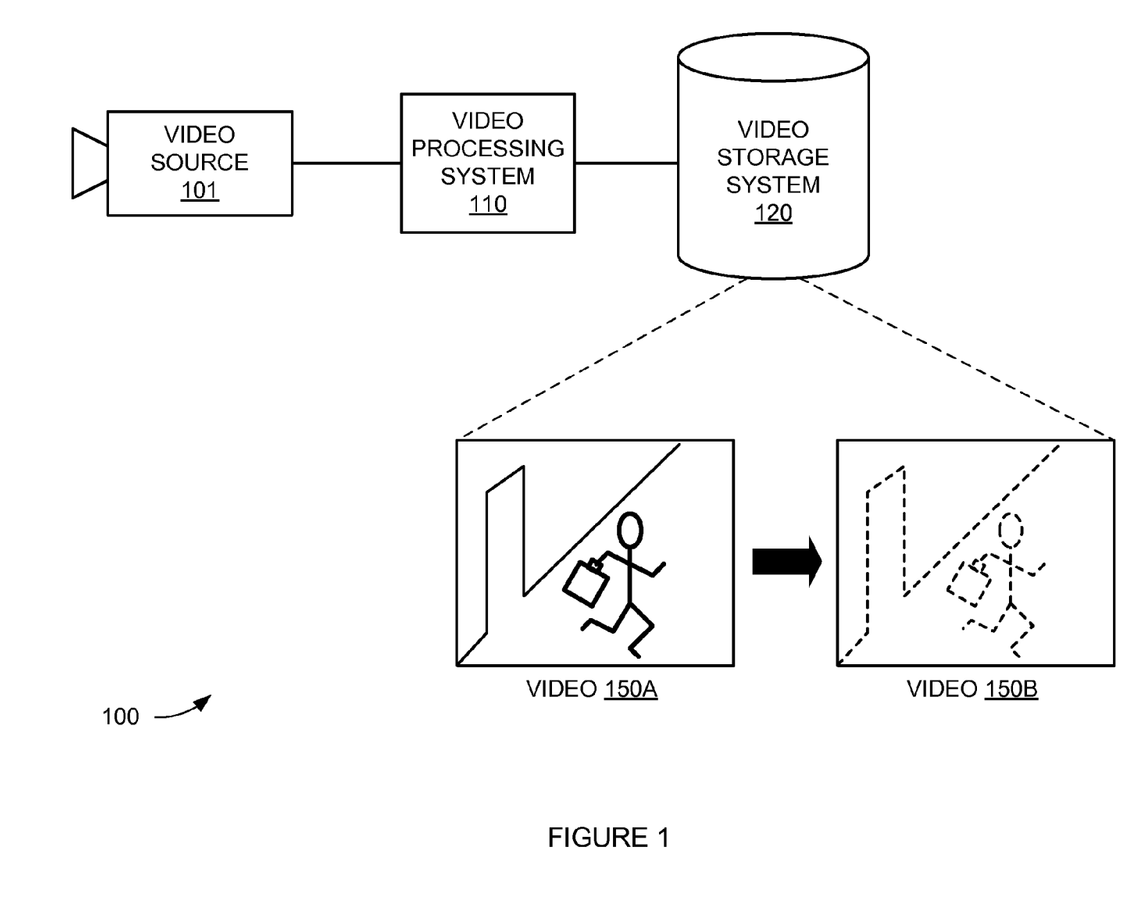
FIG. 1 illustrates a video system.

FIG. 1 illustrates video system 100. Video system 100 comprises video source 101, video processing system 110, and video storage system 120. Video is received from video source 101 and stored in video storage system 120. Video 150 is an example of a video stored in video storage system 120. Video 150A is a high quality video that was stored at one point in time and later converted to or replaced by video 150B which is a lower quality version of video 150A.

Figure 2:
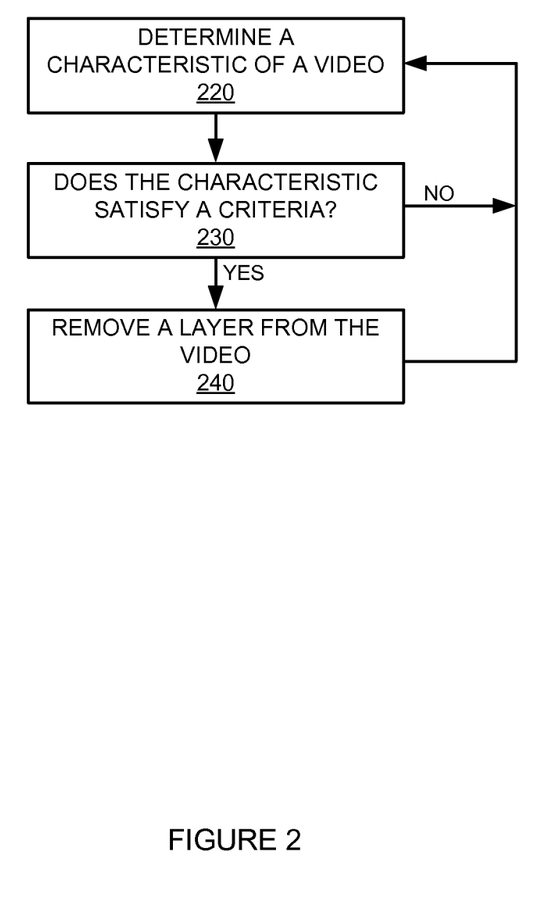
FIG. 2 illustrates an operation of a video system.

FIG. 2 illustrates an operation of video system 100. The steps of the operation are indicated below parenthetically. Video processing system 110 determines a characteristic of video 150A (220). If the characteristic does not satisfy a criteria, no further action is taken and video 150A remains stored in video storage system 120 unchanged (230). If the characteristic satisfies the criteria, at least one of a plurality of layers is removed from video 150A (240).

In the examples above, the quality of the video may be reduced in a number of ways including varying multiple parameters of the video. These parameters include the bit rate, frame rate, resolution, color information, or other parameters, including combinations thereof. Reducing any of these parameters generally decreases the quality of the video and reduces the amount of storage space required to store the video. Video processing system 110 may perform a variety of processes on the video in order to change one or more of these parameters. The functions above are described as being performed by video processing system 110 but could also be performed by video source 101, video storage system 120, or by other devices.

Video may be processed and stored in many different formats. In some systems, video is formatted using Scalable Video Coding (SVC). SVC is a video compression and formatting standard that is an extension of the H.264/MPEG-4 standard. SVC allows a high quality video stream, which contains multiple quality layers, to be encoded into a single bitstream. Quality layers may be encoded with different spatial resolutions, different bit rates, different frame rates, different levels of color information, or combinations of these parameters. The different quality layers are encoded as subset layers or subset bitstreams of the full, high quality, bitstream. In other words, a lower quality version of the video may be obtained or created by removing packets or groups of data from the high quality bitstream. In this way, the high quality video can be converted to a lower quality version that requires less bandwidth or storage space without fully reprocessing the video to produce the lower quality version.

Figure 5:
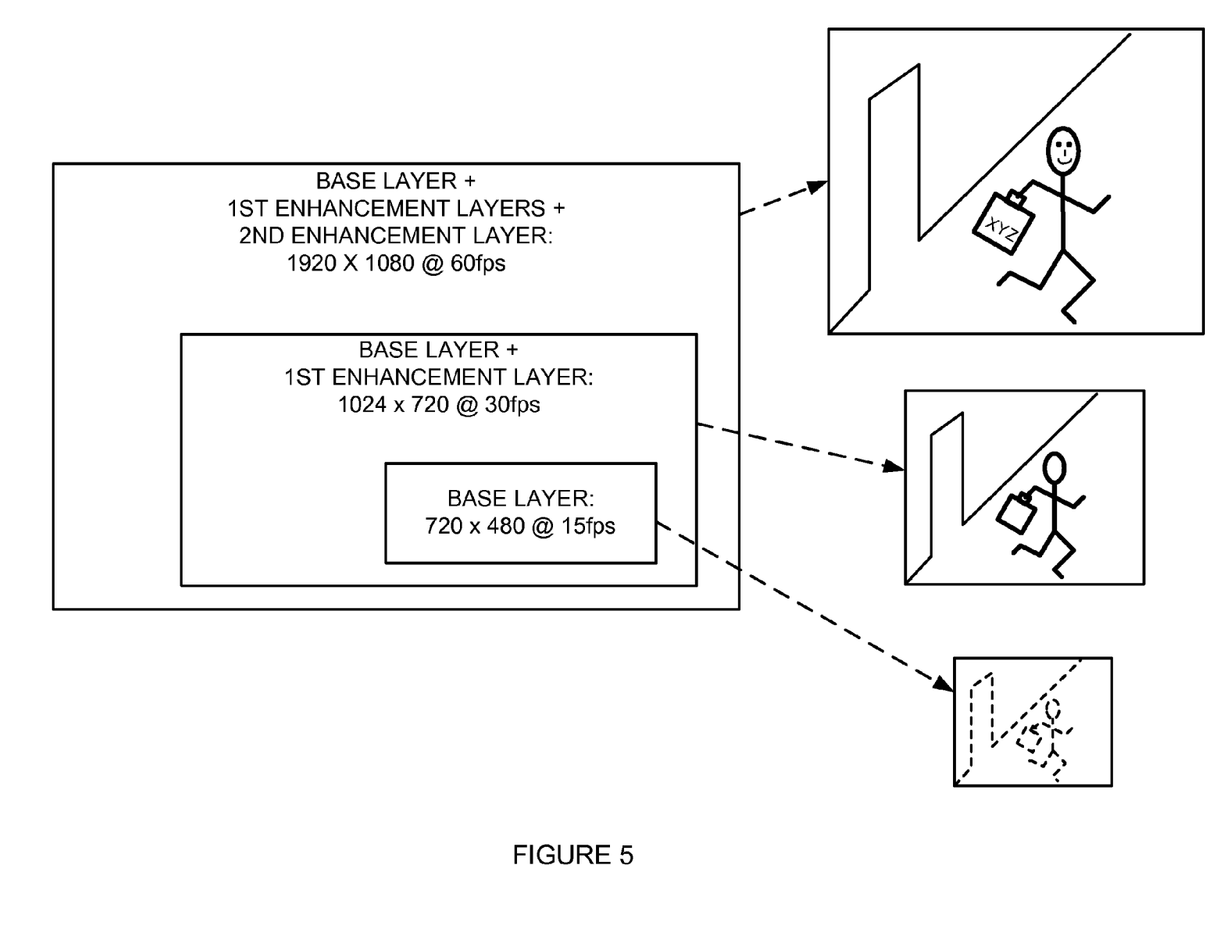
FIG. 5 illustrates SVC encoded video.

For example, video stored using SVC can easily be used with or transmitted to multiple types of devices. FIG. 5 illustrates one example of SVC video. The highest quality bitstream includes all of the available layers. In the example of FIG. 5, the highest quality video includes the base layer and the first and second enhancement layers. It provides a video stream that may be used for viewing on a high resolution monitor. In this example, the video has a resolution of 1920 by 1080 pixels and provides 60 frames per second. This configuration maximizes picture quality and detail.

An SVC layer may be removed when providing the video for use on a smaller monitor where the highest level of quality is not needed or cannot be utilized due to storage or transmission bandwidth limitations. The SVC layer is removed by simply removing packets or subsets of the data from the high quality file or bitstream. In FIG. 5, the removal of the second enhancement layer results in video with a resolution of 1024 by 720 pixels at 30 frames per second. In some cases, the process of reducing the quality of the video or removing SVC layers may be referred to as 'thinning' of the video.

An additional SVC layer may be dropped or deleted to further reduce the quality of the video. For example, the quality of the video may need to be further reduced in order to transmit it to a smartphone or other portable device because bandwidth to that device is further limited, because the screen is small, or for other reasons. Similar to the initial reduction in quality described above, this further quality reduction is accomplished by removing additional packets or groups of data from the bitstream. In the example of FIG. 5, removal of another layer leaves only the base layer. The base layer provides video with a resolution of 720 by 480 pixels at 15 frames per second.

It should be understood that FIG. 5 is one example of SVC encoded video and many other variations are possible. Other implementations may include additional video layers, different resolutions, different frame rates, different color pallets, or other variations.

The specific steps involved in removing SVC layers may vary depending on the implementation of the file system. In one example, the entire video file may be retrieved and modified before being re-stored in the storage system. In some cases the process of retrieving the original file may result in removal of the original file from the storage system while the extra step of removing the original file may be required in other cases. In another example, SVC layers may be deleted without retrieving or re-storing the unaffected layers. In yet another example, the different layers may be stored as separate files that are linked to or reference each other.

Referring back to FIG. 1, video source 101 may comprise any device having the capability to capture video or images. Video source 101 comprises circuitry and an interface for transmitting the video or images. Video source 101 may be the device that performs the initial optical capture of video or may be an intermediate transfer device. For example, video source 101 may be a video camera, still camera, internet protocol (IP) camera, video switch, video buffer, video server, or other video transmission device, including combinations thereof.

Video processing system 110 may comprise any device for processing video, video streams, or images. Video processing system 110 comprises processing circuitry and an interface for receiving and transmitting video. Video processing system 110 is capable of performing one or more processes on video received from video source 101 or other sources. The processes performed on the video may include transformations, mathematical computations, modifications, analytical processes, conditioning, other processes, or combinations thereof. Video processing system 110 may also comprise additional interfaces for transmitting or receiving video, a user interface, memory, software, communication components, power supply, or structural support. Video processing system 110 may be a video analytics system, video management system, server, computing system, or some other type of processing device, including combinations thereof.

Video storage system 120 comprises any device for storing video or images. Video storage system 120 receives and stores the video from video processing system 110, video source 101, or other devices, for later use or retrieval. Video storage system 120 comprises components for storage of data and an interface for receiving video or images. The storage components of video storage system 120 may comprise a disk drive, optical disk, flash memory, solid state memory, tape drive, or other device for storage of digital data, including combinations thereof. Video storage system 120 may also comprise additional interfaces for transmitting or receiving video or images, a user interface software, power supply, or structural support. Video storage system 120 may be a server, disk array, database, digital video recorder, or another device which provides storage of digital data.

Figure 3:
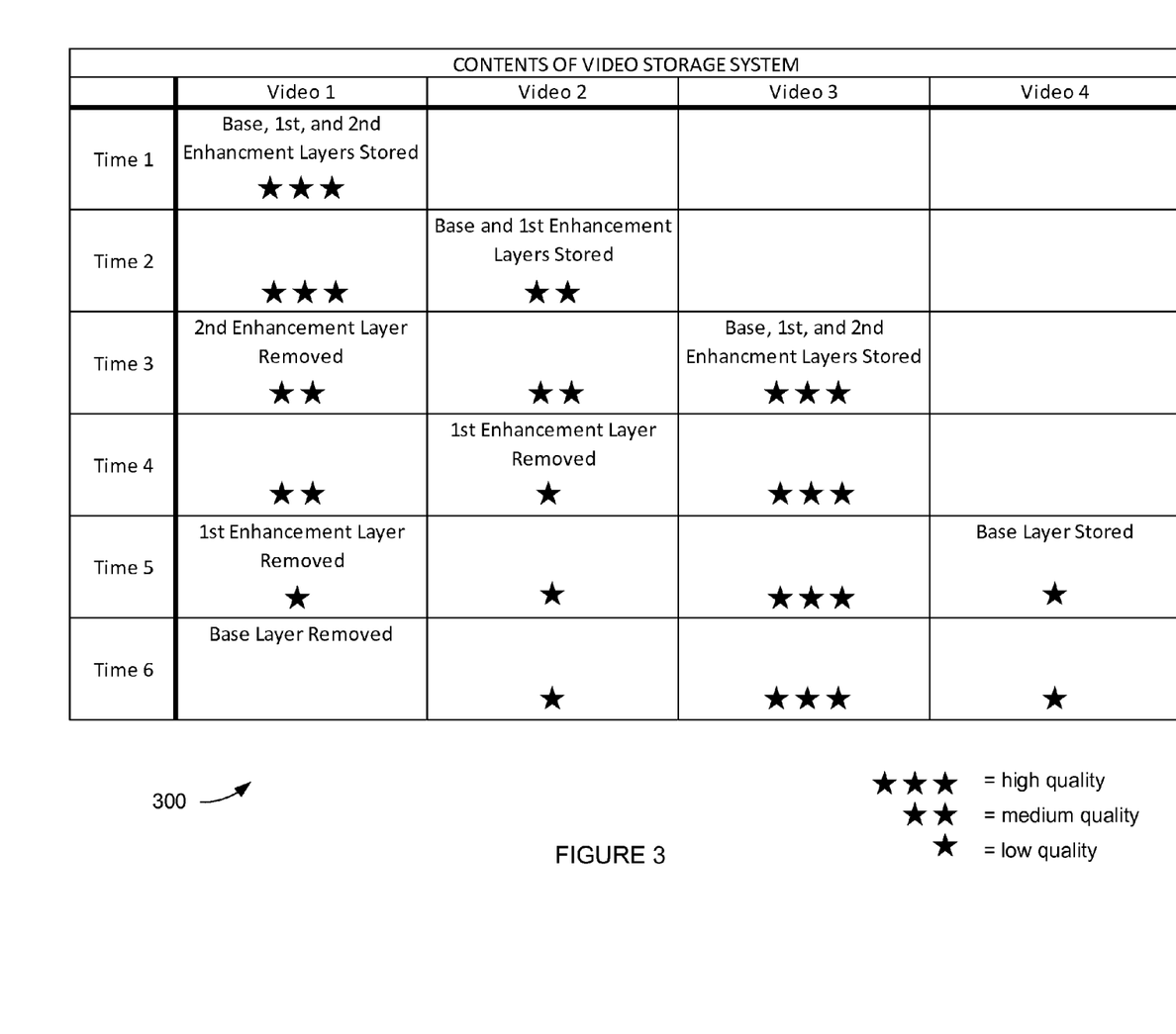
FIG. 3 illustrates a table showing the contents of a video storage system over time.

Table 300 of FIG. 3 illustrates one example of the contents of a video storage system over time. Video storage system 120 is one example of the video storage system of FIG. 3 but other variation and configurations are possible. Table 300 illustrates the contents of the video storage system at different points in time as the method of FIG. 2, or a similar method, is successively performed on the contents of the video storage system. For illustration purposes, the video storage system of FIG. 3 contains only four videos. A typical video storage system will contain many more videos.

The videos listed in table 300 are stored using SVC layers. In this example, there are three SVC layers. The base layer comprises a low quality bitstream or video file. A first enhancement layer can also be added to the base layer. The first enhancement layer adds additional packets or groups of data to the base layer that increases the quality of the video. The increase in quality may be accomplished through increasing the bit rate, frame rate, resolution, or other parameters of the video, including combinations thereof. A second enhancement layer may be added to further increase the quality of the video in a similar manner. In this example, storing video in the highest possible quality comprises storing the base layer along with the first and second enhancement layers. Other configurations that include more or fewer SVC layers are possible.

Prior to time 1, no videos are stored on the video storage system. At time 1, video 1 is received and stored. It is stored in a high quality format that includes multiple SVC layers. In this example, the layers included are the base layer, the first enhancement layer, and the second enhancement layer. In variations of this example, additional layers may be included which result in further increases or improvements to frame rate, bit rate, resolution, or other parameters. The stars on table 300 indicate the quality of each video that remains at each point in time.

At time 2, video 2 is stored. Only the base and first enhancement layers are stored for video 2. This may be because these are the only layers available for video 2, because higher quality layers are available but there is no need to store them, or for other reasons. Video 2 may also be stored in other locations at the same time. These other instances of video 2 may be stored at different quality levels, in different formats, or with other variations.

At time 3, video 3 is stored in high quality format. In other words, video 3 includes the base layer and the first and second enhancement layers. Also at time 3, the second enhancement layer of video 1 is deleted or removed. This deletion may have been necessary to free up storage space on the storage system for video 3 or may have been needed for other reasons. Video 1 remains available but is now only available in a reduced quality. The base and first enhancement layers of video 1 remain stored but the second enhancement layer is no longer available. Because the SVC layers are assembled in a manner such that the data associated with different layers is stored in separate packets or groups, the second enhancement layer can be deleted without affecting the base or first enhancement layers. In other words, after deletion of the second enhancement layer, the base and first enhancement layers are still usable without significant further formatting, processing, or reconfiguration.

In some examples, the enhancement layers of videos will only be removed when the storage system is full and storage space is needed. In other examples, enhancement layers may be removed on a periodic or scheduled basis regardless of whether there is an immediate need to free up more storage space.

At time 4, the first enhancement layer of video 2 is removed or deleted. After this deletion, only the base layer of video 2 remains. Due to removal of the first enhancement layer, video 2 now requires less storage space but is still available in a lower quality form. As in the other examples, removal of the first enhancement layer may result in a reduction of the bit rate, frame rate, color information, resolution, other parameter, or combination thereof. In many cases, reducing the quality of video 2 is a desirable alternative over deleting video 2 in its entirety because a need for video 2 may arise at some point after time 4.

At time 5, the base layer of video 4 is stored. Enhancement layers may not be stored because no higher layers are available, because higher layers are available but there is no desire to store them, because the additional storage space needed for the enhancement layers is not available, or for other reasons.

At time 6, the base layer of video 1 is removed or deleted. At this point, video 1 has been removed from the storage system as is no longer available for viewing from this storage system at any quality level. The base layers of video 2 and video 4 remain in the storage system as well as the base and both enhancement layers of video 3.

In some examples, SVC layers may be deleted based on a preset time schedule. For example, the highest layer may automatically be removed two weeks after being stored and the next layer removed one month later. The time schedule may vary by video, by group or classification of video, by source of the video, or based on some other characteristic. Some video or groups of video may be afforded longer timeframes before layers are deleted because those videos are more valuable, more useful, have a higher likelihood of being needed in the future, or for other reasons.

Videos may also be assigned different retention priorities with respect to each other. For example, at time 5 removal of a layer may have been required in order to free up storage space for video 4. Video 1 may have been chosen to have a layer removed because it was the oldest, because layers had been removed from the other videos more recently, or because video 1 had been assigned a lower priority than the other videos. A single priority may be assigned to each video or individual priority values may be assigned to each layer of each video. In the example above, the first enhancement layer of video 1 may have been assigned a low priority such that it was the first to be removed when space was needed at time 5, but the base layer of video 1 may have a higher priority such that layers of videos 2-4 will be subject to deletion before the remaining base layer of video 1. Many other removal schedules, priorities, and plans are possible.

Figure 4:
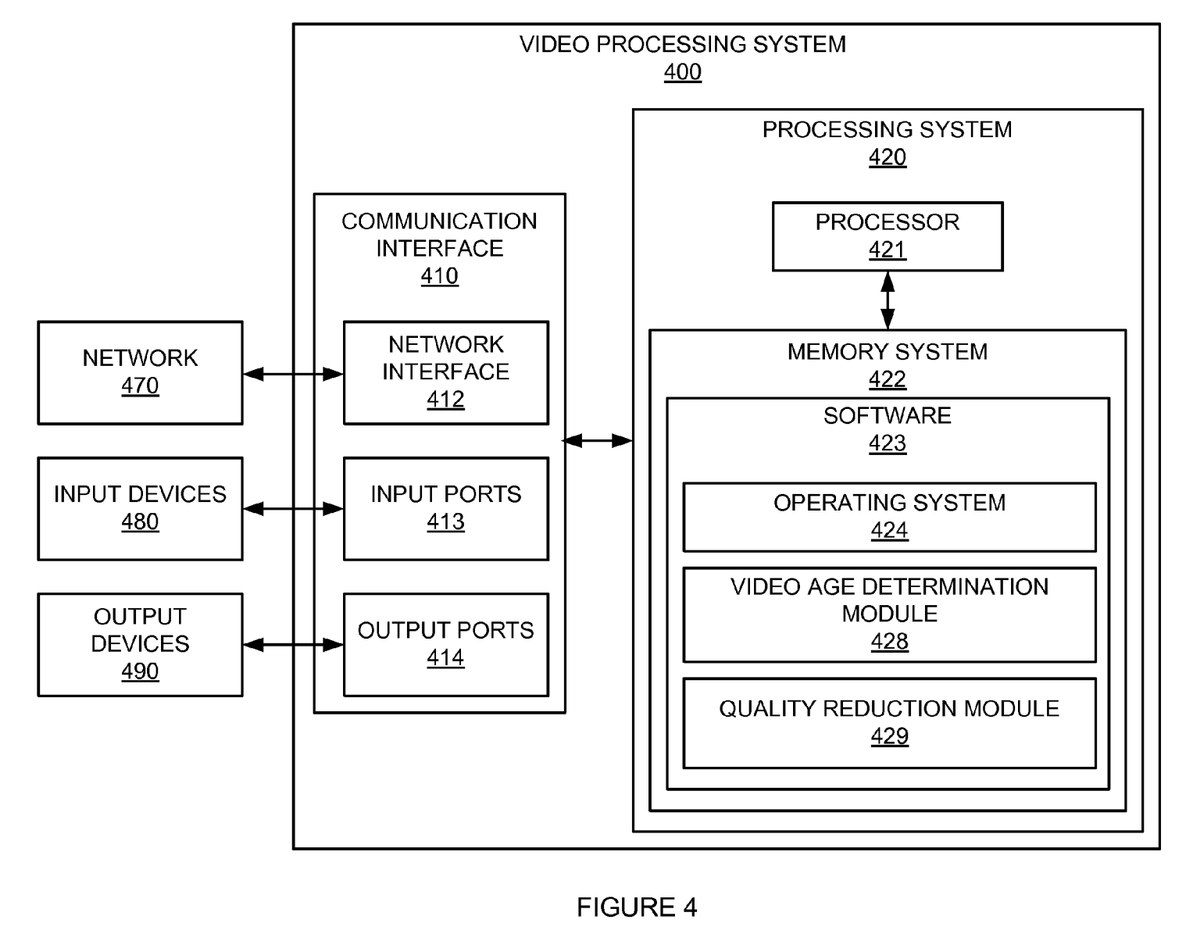
FIG. 4 illustrates a video processing system.

FIG. 4 illustrates video processing system 400. Video processing system 400 includes communication interface 410 and processing system 420. Processing system 420 is linked to communication interface 410 through a communication link. Processing system 420 includes processor 421 and memory system 422.

Communication interface 410 includes network interface 412, input ports 413, and output ports 414. Communication interface 410 includes components that communicate over communication links, such as network cards, ports, RF transceivers, processing circuitry and software, or some other communication device. Communication interface 410 may be configured to communicate over metallic, wireless, or optical links. Communication interface 410 may be configured to use TDM, IP, Ethernet, optical networking, wireless protocols, communication signaling, or some other communication format, including combinations thereof.

Network interface 412 is configured to connect to external devices over network 470. Input ports 413 are configured to connect to input devices 480 such as a video source, keyboard, mouse, or other devices. Output ports 414 are configured to connect to output devices 490 such as a display, a printer, or other devices.

Processor 421 includes microprocessor and other circuitry that retrieves and executes operating software from memory system 422. Memory system 422 comprises software 423. Memory system 422 may be implemented using random access memory, read only memory, a hard drive, a tape drive, flash memory, optical storage, or other memory apparatus.

Software 423 comprises operating system 424, video age determination module 428, and quality reduction module 429. Software 423 may also comprise additional computer programs, firmware, or some other form of non-transitory, machine-readable processing instructions. When executed by processor 421, software 423 directs processing system 420 to operate video processing system 400 to remove layers of video from storage as described herein using video age determination module 428 and quality reduction module 429.

It should be understood that the functions and features of video processing system 400 illustrated in FIG. 4 may be implemented in or performed by video processing system 110, video storage system 120, by another device, or the functions may be distributed across multiple devices.

The systems and methods discussed above may also be beneficial during transmission of video, as discussed below in reference to FIGS. 6-9. Therefore, altering the quality of video for transmission of video may be used separately or in conjunction with the video storage embodiments discussed above.

In video security, surveillance, and monitoring applications, it is often desirable, or even required, to view the video on a real-time basis. In the context of the description which follows, viewing or monitoring of video on a "real-time" basis means that the video is being viewed on a live, or nearly live, basis with minimal delay. It is understood that processing, transmitting, and display of video requires relatively small periods of time such that there are small delays between the actual events and the viewing of those events on video. These delays are typically on the order of seconds or fractions of seconds. Despite these delays, the viewing of video under these circumstances is still categorized as being performed on a "real-time" basis in this description as the video is not being retrieved for viewing at some point significantly later in time.

In some cases, video must transmitted over a communication link in order to be viewed, processed, or stored. The communication link may be shared with other users, subject to interference, have occasional bandwidth limitations for other reasons, or be affected by a combination of these types of factors.

In some cases, temporary bandwidth limitations may be so severe that video cannot be transmitted over the link during these periods. In other cases, enough bandwidth is still available to transmit the video, but at a reduced quality. Reduced quality video contains less data and, therefore, less bandwidth is needed to maintain transmission on a real-time basis.

The quality of the video may be reduced in a number of ways including varying one or more parameters of the video. These parameters include the codec, bit rate, frame rate, resolution, color information, or other parameters, including combinations thereof. If the quality of the video is reduced sufficiently, it can still be streamed over the communication link real-time even though the communication link is bandwidth limited. A person or system on the receiving end may still monitor or process the video in a non-delayed manner, albeit at a lower quality.

In one example, a loading dock may be monitored using one or more video cameras. Video of the loading dock is transmitted to the monitoring location over a wireless link. The monitoring location may be in the same building or may be at a different physical location. The wireless link may typically have the bandwidth to transmit the video real-time in a high quality format. However, there may be times when the wireless signal is weak and less bandwidth is available. The bandwidth may also vary for other reasons such as transmission error rates, link drop outs due to interference, or any other reason that the ability to transmit data on a link may suffer.

During a period in which the signal over the wireless link is degraded and causes a reduction in the bandwidth available for video transmission, a reduced quality version of the video is transmitted. The reduced quality may not allow an operator to have a finely detailed view of the loading dock. For example, the operator may not be able to read a license plate number of a truck at the loading dock. However, the operator may still monitor the activities and see a lower quality view of the activities on the loading dock on a real time basis.

The alternative would be to discontinue transmission of video until the signal improves or more bandwidth otherwise became available. However, this would result in one of two potentially undesirable situations. In the first situation, reception and monitoring of the high quality video would resume from the place it ended. In this case, the future monitoring would be occurring on a delayed basis. In the second situation, real time monitoring would resume at the time more bandwidth became available but the events that occurred during the time the bandwidth was reduced would have been skipped. In other words, if reduced quality video is not transmitted during the bandwidth limited period, video is either skipped or viewed on a delayed basis going forward.

In addition to resuming monitoring of high quality video on a real-time basis when more bandwidth is available, it is also desirable to eventually receive the high quality video, on a delayed basis, covering the period when the bandwidth was limited. Continuing with the loading dock example above, real-time monitoring of the lower quality video occurs during the period of bandwidth limitation. When more bandwidth is available, monitoring of the real-time high quality video of the loading dock will resume and the high quality video covering the period of limited bandwidth will also be transmitted. In this way, an operator will have a real-time view of the activities occurring during the lower bandwidth period. The operator will also receive the high quality video for that period in case detailed information, a license plate number for example, is needed from that period of time. This information may not be available in or discernable from the reduced quality video.

Figure 6:
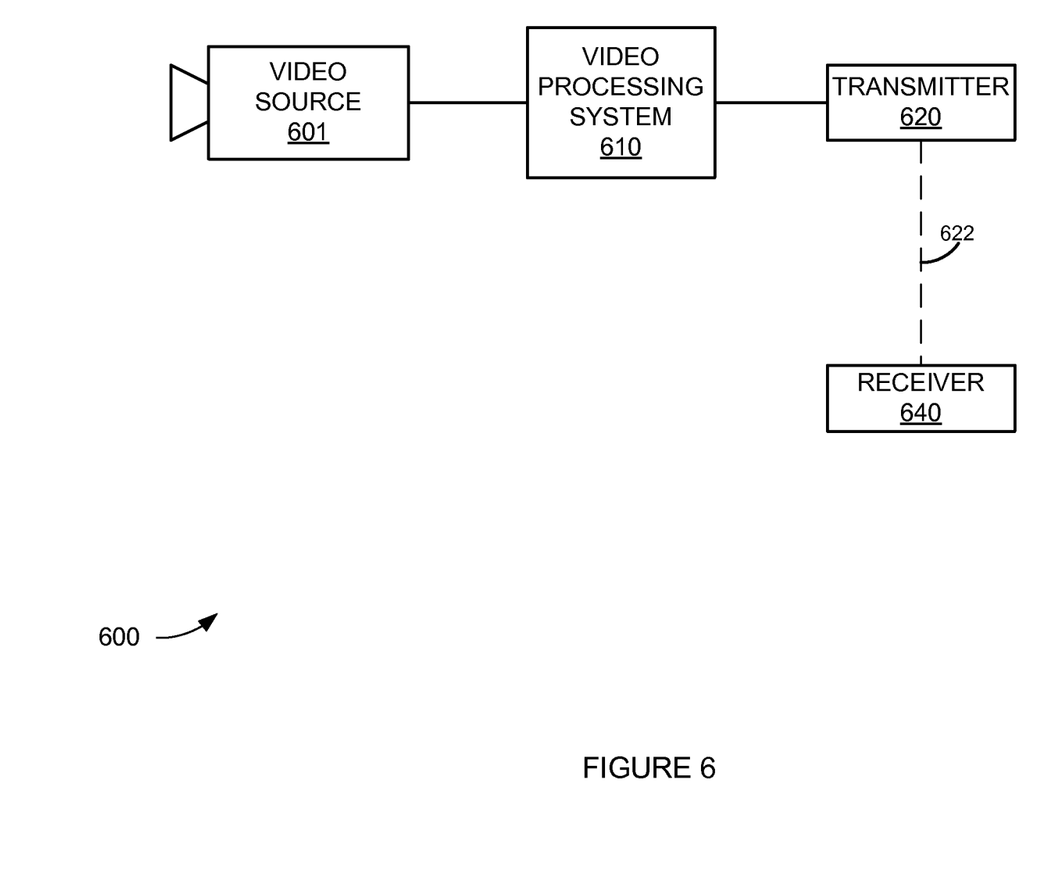
FIG. 6 illustrates a video system.

FIG. 6 illustrates video system 600. Video system 600 comprises video source 601, video processing system 610, transmitter 620, and receiver 640. Video processing system 610 receives video from video source 601 and transmits it to receiver 640 over communication link 622 using transmitter 620.

Figure 7:
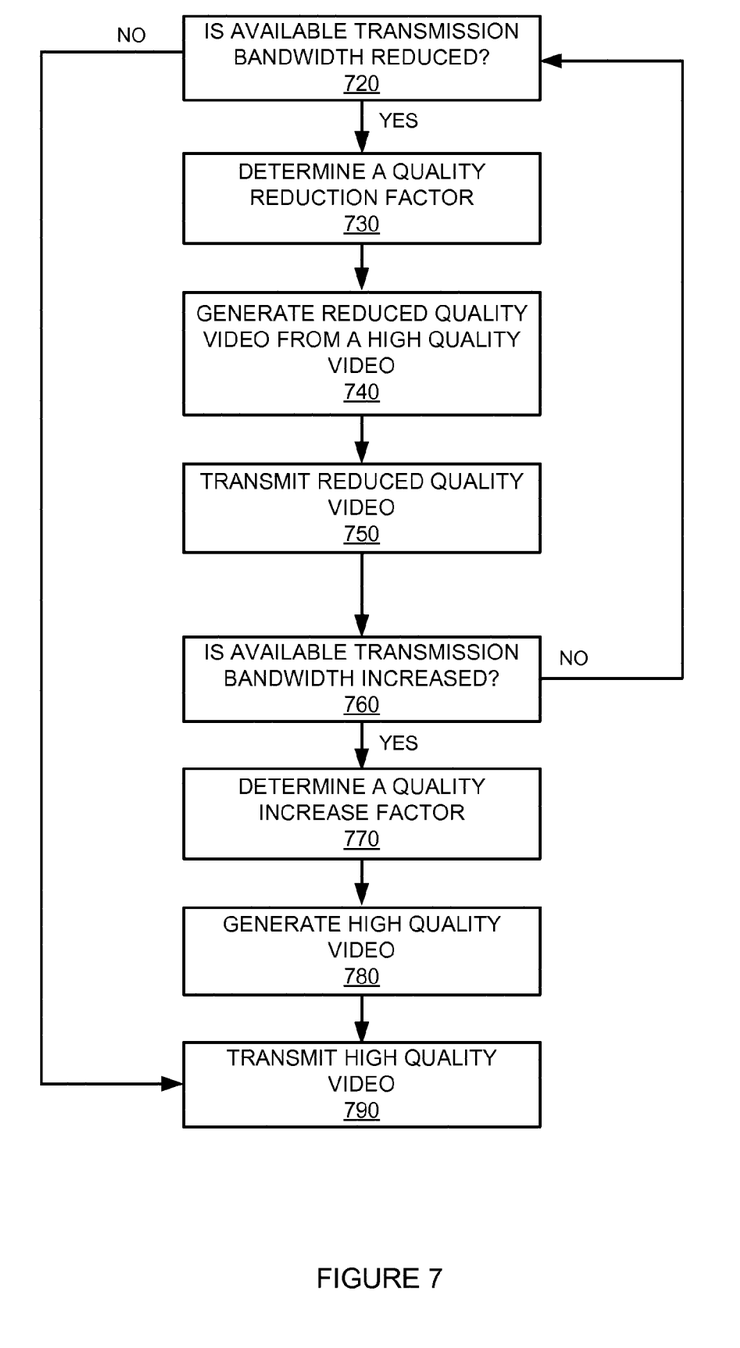
FIG. 7 illustrates an operation of a video system.

FIG. 7 illustrates an operation of video system 600. The steps of the operation are indicated below parenthetically. While transmitting video to receiver 640 using transmitter 620, video processing system 610 determines if the available transmission bandwidth over communication link 622 is reduced (720). If not, video processing system 610 continues transmitting high quality video over communication link 622 (770).

If the bandwidth is reduced, a quality reduction factor is determined based on the available bandwidth (730). Using the high quality video and the quality reduction factor, a reduced quality video is generated (740). The reduced quality video is then transmitted by video processing system 610 to receiver 640 over communication link 622 using transmitter 620 (750). When the available bandwidth on communication link 622 increases, video processing system 610 determines a quality increase factor to return the video to a higher quality based on the quality reduction factor that was determined in step 730 (770). This factor may increase the quality of the video to its highest quality or may increase the quality of the video to a level less than highest quality but that can be supported by the current available bandwidth. Video processing system 610 then generates high quality video based on the quality increase factor (780). Video processing system 610 then resumes transmission of the high quality video (790). This resumption in transmission of the high quality video may include high quality video transmitted in real-time as well as the past high quality video which was captured during the time the transmission bandwidth was limited.

In the examples described herein, video transmission bandwidth may be reduced for a variety of reasons. Bandwidth may be limited due to a low radio frequency (RF) signal strength, signal interference, equipment degradation, power limitations, weather interference, or other factors, including combinations thereof. Bandwidth may also be limited for reasons related to other uses of the communication link including shared use of the link, temporary oversubscription, or prioritized use of the communication link. Use of the communication link by certain devices or systems may be intentionally limited during time periods when higher priority signal or devices are in operation or expected to be in operation. These higher priority devices signals or devices may be related to priority radar, aircraft communications, aviation equipment, mission critical communications, or other signals or devices that have been given priority use of the communication link.

Referring back to FIG. 6, video source 601 may comprise any device having the capability to capture video or images. Video source 601 comprises circuitry and an interface for transmitting video or images. Video source 601 may be the device that performs the initial optical capture of video or may be an intermediate transfer device. For example, video source 601 may be a video camera, still camera, internet protocol (IP) camera, video switch, video buffer, video server, or other video transmission device, including combinations thereof.

Video processing system 610 may comprise any device for processing and transferring video, video streams, or images. Video processing system 610 comprises processing circuitry and an interface for receiving and transmitting video. Video processing system 610 is capable of performing one or more processes on video received from video source 601 or other sources. The processes performed on the video may include processes to generate reduced quality instantiations of the video.

Video processing system 610 may also comprise additional interfaces for transmitting or receiving video, a user interface, memory, software, communication components, power supply, or structural support. Video processing system 610 may be a video analytics system, video management system, server, computing system, or some other type of processing device, including combinations thereof. It should be understood that the functions of video processing system 610 may be integrated into video source 601, performed by other devices, or a combination thereof.

Communication link 622 comprises a medium for transmitting data. The medium of communication link 622 may be metal, air, space, glass, plastic, or combinations thereof. Communication link 622 may be a wireless link in which data is transmitted using RF signals. Communication link 622 could use various communication protocols, such as TDM, IP, Ethernet, telephony, optical networking, hybrid fiber coax (HFC), communication signaling, wireless protocols, or some other communication format, including combinations thereof. Communication link 622 may be a direct link or could include intermediate networks, systems, or devices.

Transmitter 620 comprises any device having communication connectivity with hardware and circuitry programmed to function as a telecommunications device and transmit data over communication link 622. Transmitter 620 may also comprise additional interfaces for transmitting or receiving data, a user interface, antenna, memory, software, other communication components, power supply, or structural support. Transmitter 620 may be a network card, wireless transceiver, RF modulator, or other communication device, including combinations thereof. It should be understood that the functions of transmitter 620 may be integrated into video source 601, video processing system 610, performed by other devices, or a combination thereof.

Receiver 640 may comprise any device having communication connectivity with hardware and circuitry programmed to function as a telecommunication device and receive data over communication link 622. Receiver 640 may also comprise additional interfaces for transmitting or receiving data, a user interface, antenna memory, software, other communication components, power supply, or structural support. Receiver 640 may be a network card, telephone, wireless transceiver, RF demodulator, or other communication device, including combinations thereof. The functions of receiver 640 may be integrated into other devices including a computer, a video management system, a storage system, and a digital video recorder.

Video may be processed, transmitted, and stored in many different formats. In some systems, video is formatted using Scalable Video Coding (SVC). SVC is a video compression and formatting standard that is an extension of the H.264/MPEG-4 standard. SVC allows a high quality video stream, which contains multiple quality layers, to be encoded into a single bitstream. Quality layers may be encoded with different spatial resolutions, different bit rates, different frame rates, different levels of color information, or by varying combinations of these parameters. The different quality layers are encoded as subset layers or subset bitstreams of the full, high quality, bitstream. In other words, a lower quality version of the video may be obtained or created by removing packets or groups of data from the high quality bitstream. In this way, high quality video can be converted to a lower quality version of the video, which requires less transmission bandwidth, without fully reprocessing the video to produce the lower quality version.

For example, SVC video can easily be pared down to lower resolutions to suit the needs of the communication link, the recipient device, the amount of storage space available, or the transmission bandwidth available. To create a lower quality video, an SVC layer is removed by removing packets or subsets of the data from the high quality file or bitstream. Additional SVC layers may be dropped or deleted to further reduce the quality of the video.

Figure 8:
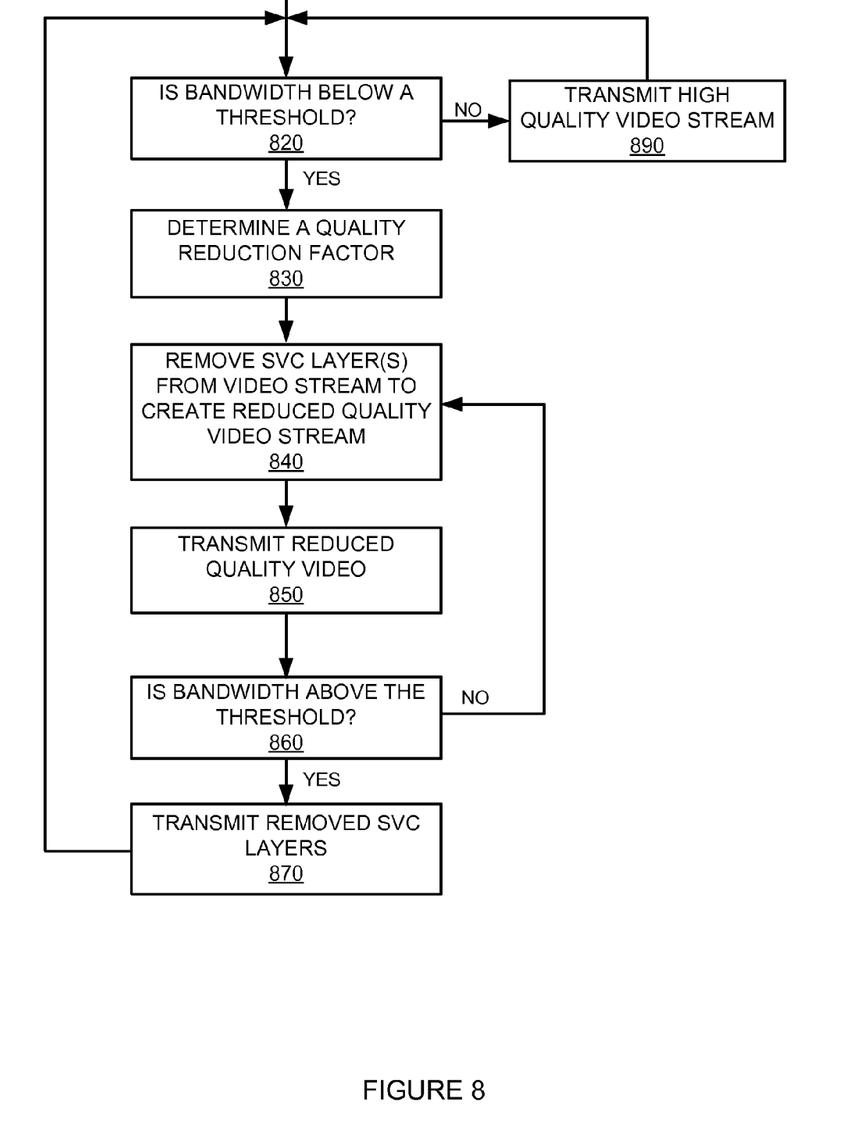
FIG. 8 illustrates an operation of a video system.

FIG. 8 illustrates an operation of video system 600, or a similar video system, with SVC encoded video. When the level of bandwidth is not great enough to support transmission of high quality video, SVC layers that enhance the quality of the video are removed and those enhanced layers may be stored for later transmission while reduced quality video containing fewer SVC layers is transmitted. When appropriate bandwidth is available, high quality video, which includes all of the available SVC layers, is transmitted real-time. Likewise, when appropriate bandwidth is available, any enhanced SVC layers that were not transmitted during a period of limited bandwidth, or all of the SVC layers, may be transmitted in order to enhance the reduced quality video that was previously transmitted in real time.

In this example, video is transferred over a wireless link using RF signals. A drop in the RF signal strength often results in a drop in available bandwidth. If the bandwidth remains above a particular threshold, the system continues transmitting the high quality video stream (890). If the RF signal strength drops and causes bandwidth to drop below a threshold, a quality reduction factor is determined (830). In this example, the quality reduction factor may be indicative of how many SVC layers will be removed from the video before it is transmitted. SVC layers are removed from the high quality video stream in order to create the reduced quality video stream (840). The removed SVC layers may be stored for transmission at a later time when bandwidth conditions allow. The reduced quality video is then transmitted over the communication link (850). This transmission occurs on a real-time basis and continues as long as the RF signal strength does not return above the threshold, or does not return above the threshold for a specified period of time (860).

When the RF signal strength increases and returns bandwidth to a value which is above the threshold for a specified period of time, real-time transmission of the high quality video, with one or more additional SVC layers, resumes. In addition, any SVC layers that were stored in step 840 may also be transmitted. In this way, real-time video was available during the entire period with little or no interruption, even though some of it was in a reduced quality. In addition, all of the removed data is eventually received such that the high quality video of the entire period is available and can be reassembled, if needed. The reassembled high quality video may be monitored as soon as it is available or may be archived for potential later use. Depending on bandwidth availability all of the removed SVC layers may not be transmitted at the same time and may be separated and transmitted at different times on a priority basis.

It should be understood that there are many possible factors that may trigger a switch between transmission of high quality video and transmission of reduced quality video.

It should also be understood that there are many different methods for reducing the quality of the video.

It should also be understood that there are many different methods for transmitting the data that is removed or withheld during the low bandwidth or low signal strength periods. In some cases, the withheld data may be transmitted using a different communication link or a separate method of communication.

Figure 9:
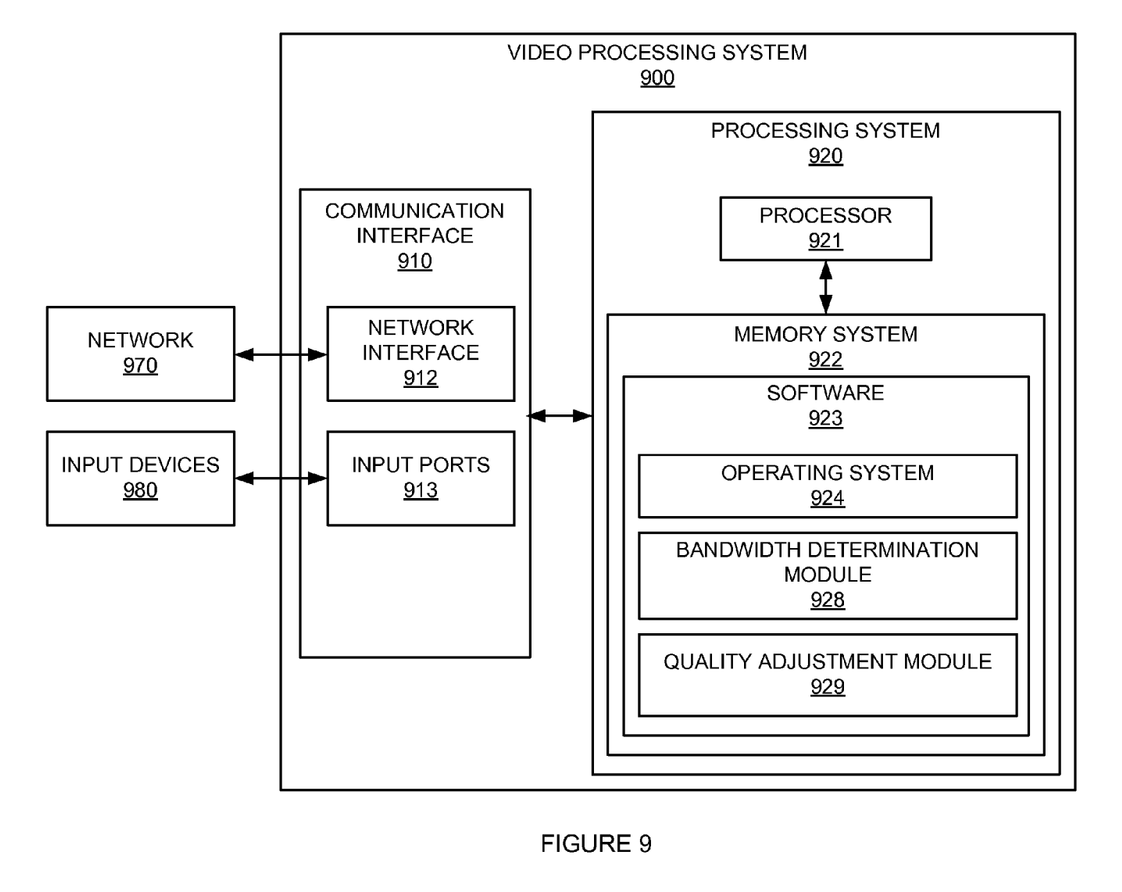
FIG. 9 illustrates a video processing system.

FIG. 9 illustrates video processing system 900. Video processing system 900 includes communication interface 910 and processing system 920. Processing system 920 is linked to communication interface 910 through a communication link. Processing system 920 includes processor 921 and memory system 922.

Communication interface 910 includes network interface 912 and input ports 913. Communication interface 910 includes components that communicate over communication links, such as network cards, ports, RF transceivers, processing circuitry and software, or some other communication device. Communication interface 910 may be configured to communicate over metallic, wireless, or optical links. Communication interface 910 may be configured to use TDM, IP, Ethernet, optical networking, wireless protocols, communication signaling, or some other communication format, including combinations thereof.

Network interface 912 is configured to connect to external devices over network 970. Input ports 913 are configured to connect to input devices 980 such as a video source (cameras), or other input devices.

Processor 921 includes microprocessor and other circuitry that retrieves and executes operating software from memory system 922. Memory system 922 comprises software 923. Memory system 922 may be implemented using random access memory, read only memory, a hard drive, a tape drive, flash memory, optical storage, or other memory apparatus.

Software 923 comprises operating system 924, bandwidth determination module 928, and quality adjustment module 929. Software 923 may also comprise additional computer programs, firmware, or some other form of non-transitory, machine-readable processing instructions. When executed by processor 921, software 923 directs processing system 920 to operate video processing system 900 to transmit reduced quality video when bandwidth is limited and increased quality video when bandwidth allows using bandwidth determination module 928 and quality adjustment module 929.

It should be understood that the functions and features of video processing system 900 illustrated in FIG. 9 may be implemented in or performed by video processing system 610, video source 601, by another device, or the functions may be distributed across multiple devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transmitting video for real-time playback to a video storage system, the method comprising:
   determining a first network transmission bandwidth available for transmitting the video to the video storage system;
   determining a video quality reduction factor that reduces a quality of the video based on the first available network transmission bandwidth;
   generating a reduced quality video using the video and the video quality reduction factor, wherein generating the reduced quality video comprises determining whether a transmit quality level indicates that the video should be reduced in quality level and, if true, removing at least one of a plurality of layers of a first portion of the video prior to transmission;
   transmitting the first portion of the reduced quality video to the video storage system for the real-time playing by a user; and
   after transmitting the first portion of the reduced quality video:
      determining a second available network transmission bandwidth, wherein the second available network transmission bandwidth is higher than the first available network transmission bandwidth,
      determining a video quality increase factor to return the video to a higher quality based on the quality reduction factor and the second available network transmission bandwidth,
      generating an increased quality video using the video and the video quality increase factor, wherein the increased quality video includes a higher quality version of the first portion of the video which was previously transmitted in the reduced quality video and includes a higher quality version of a second portion of the video which was not previously transmitted in the reduced quality video, and
      transmitting the increased quality video, which comprises the first portion of the video and the second portion of the video, to the video storage system using the second available network transmission bandwidth for the real-time playing of the second portion of the video by the user and delayed playback of the increased quality video by the user after storing the increased quality video in the video storage system, wherein, also after storing the increased quality video:
  determining an amount of time that the increased quality video has been stored in the video storage since receipt by the video storage system;
  determining whether the amount of time exceeds a predetermined time threshold; and
  upon the amount of time exceeding the predetermined time threshold, removing the at least one of the plurality of layers from the increased quality video stored on the video storage system.

2. The method of claim 1, wherein the plurality of layers of the video comprises scalable video coding (SVC) layers.

3. A video system comprising:
  a video storage system;
  a network communication interface that communicates with the video storage system;
  a processing unit linked to the communication interface; and
  one or more modules for execution on the processing unit that when executed cause the processing unit to:
    determine a first network transmission bandwidth available for transmitting the video to a video storage system;
    determine a video quality reduction factor that reduces a quality of the video based on the first available network transmission bandwidth;
    generate a reduced quality video using the video and the video quality reduction factor, wherein generating the reduced quality video comprises determining whether a transmit quality level indicates that the video should be reduced in quality level and, if true, removing at least one of a plurality of layers of a first portion of the video prior to transmission;
    transmit the first portion of the reduced quality video to the video storage system for real-time playing by a user; and
    after transmitting the first portion of the reduced quality video, using the processing unit to:
      determine a second available network transmission bandwidth, wherein the second available network transmission bandwidth is higher than the first available network transmission bandwidth,
      determine a video quality increase factor to return the video to a higher quality based on the quality reduction factor and the second available network transmission bandwidth,
      generate an increased quality video using the video and the video quality increase factor, wherein the increased quality video includes a higher quality version of the first portion of the video which was previously transmitted in the reduced quality video and includes a higher quality version of a second portion of the video which was not previously transmitted in the reduced quality video,
      transmit the increased quality video, which comprises the first portion of the video and the second portion of the video, to the video storage system using the second available network transmission bandwidth for real-time playing of the second portion of the video by the user and delayed playback of the increased quality video by the user after storing the increased quality video in the video storage system,
  wherein, also after storing the increased quality video using the processing unit to:
    determine an amount of time that the increased quality video has been stored in the video storage since receipt by the video storage system;
    determine whether the amount of time exceeds a predetermined time threshold; and
    upon the amount of time exceeding the predetermined time threshold, remove the at least one of the plurality of layers from the increased quality video stored on the video storage system.

4. The video system of claim 3, wherein the plurality of layers of the video comprises scalable video coding (SVC) layers.

5. The video system of claim 3 wherein the one or more modules for execution on the processing unit, are further operable to, after transmitting the first portion of the video without the at least one of the plurality of layers, determine that the second available transmission bandwidth is above a predetermined threshold value and to then transmit to the video storage system the at least one of the plurality of layers of the first portion of the video which were previously removed.

* * * * *